US012650914B2

(12) United States Patent
Palop et al.

(10) Patent No.: US 12,650,914 B2
(45) Date of Patent: Jun. 9, 2026

(54) NARX ARCHITECTURE FOR TASK CONTENTION MODELS USING TIME-SERIES AND FINE-GRAIN INSTRUMENTATION FOR MPSoCs

(71) Applicant: Rockwell Collins, Inc., Cedar Rapids, IA (US)

(72) Inventors: Hector Palop, Cork (IE); Raúl de la Cruz Martínez, Rochestown (IE)

(73) Assignee: Rockwell Collins, Inc., Cedar Rapids, IA (US)

( * ) Notice: Subject to any disclaimer, the term of this patent is extended or adjusted under 35 U.S.C. 154(b) by 78 days.

(21) Appl. No.: 18/740,058

(22) Filed: Jun. 11, 2024

(65) Prior Publication Data

US 2025/0013549 A1     Jan. 9, 2025

(30) Foreign Application Priority Data

Jul. 4, 2023     (EP) .................................... 23183378

(51) Int. Cl.
*G06F 11/34*          (2006.01)
*G06F 11/30*          (2006.01)

(52) U.S. Cl.
CPC ...... *G06F 11/3447* (2013.01); *G06F 11/3006* (2013.01)

(58) Field of Classification Search
CPC ............. G06F 11/3447; G06F 11/3006; G06F 9/4881; G06F 11/3419; G06F 11/3452;
(Continued)

(56) References Cited

U.S. PATENT DOCUMENTS 10,896,371 B2 * 1/2021 Sun ........................ G06N 5/022
11,513,850 B2 11/2022 Bequet et al.
(Continued)

FOREIGN PATENT DOCUMENTS

CN          115511062 A     12/2022
EP           4177747 A1      5/2023
(Continued)

OTHER PUBLICATIONS

ARINC, "Avionics Application Software, Standard Interface, Part 0, Overview of ARINC 653," SAE-ITC, Nov. 15, 2021, 51 pages.
(Continued)

*Primary Examiner* — James C Kerveros
(74) *Attorney, Agent, or Firm* — Suiter Swantz IP

(57)          ABSTRACT
A computer-implemented method of predicting a timeseries of time delays resulting from contention between tasks running in parallel on a multi-processor system using a trained Machine Learning based Task Contention Model may include executing a plurality of actual execution tasks on the multi-processor system in isolation, and for each task and during execution of the respective task, capturing a timeseries including a plurality of uWindows. The method may also includes inferring, from a time-agnostic ML based regressor, a predicted contention delay for the first uWindow of the timeseries when two or more of the plurality of actual execution tasks are executed on parallel on the multi-processor system. The method further includes inferring, from a Non-linear AutoRegressor with exogenous inputs (NARX), predicted contention delays for each subsequent uWindow of the timeseries based on the respective captured snapshot, and the predicted values for the previous time periods fed back into the NARX.

14 Claims, 9 Drawing Sheets

100

(58) Field of Classification Search
CPC ........ G06N 20/10; G06N 3/0442; G06N 5/01; G06N 20/00
USPC ........................................................ 714/799
See application file for complete search history.

(56) References Cited

U.S. PATENT DOCUMENTS

| | | | | |
|---|---|---|---|---|
| 2006/0288260 | A1* | 12/2006 | Xiao | G05B 23/0232 |
| | | | | 714/48 |
| 2023/0106360 | A1* | 4/2023 | Pattipati | G06N 20/00 |
| | | | | 315/307 |
| 2023/0267684 | A1* | 8/2023 | Yin | G06N 3/094 |
| | | | | 345/419 |
| 2024/0078289 | A1* | 3/2024 | Gollapudi | G06F 11/3696 |

| | | | | |
|---|---|---|---|---|
| 2024/0419137 | A1* | 12/2024 | Schillinger | G05B 13/048 |
| 2025/0013549 | A1* | 1/2025 | Palop | G06N 3/0442 |
| 2025/0181979 | A1* | 6/2025 | Lee | G06F 9/50 |

FOREIGN PATENT DOCUMENTS

| | | |
|---|---|---|
| EP | 4177750 A1 | 5/2023 |
| EP | 4177756 A1 | 5/2023 |

OTHER PUBLICATIONS

CAST, "Multi-core Processors," Position Paper, CAST-32A, Nov. 2016, 23 pages.

European Aviation Safety Agency, "MULCORS—Use of MULticore proCessors in airborne Systems," Jun. 2011, 163 pages.

European Patent Office, European Search Report received in European Application No. 23183378.1, Dec. 15, 2023, 7 pages.

\* cited by examiner

FIG. 1

| Isolation (solo) | | |
|---|---|---|
| Domain | | Instructions |
| Run with | | Instr. executed $i_1^C, i_2^C, \ldots, i_n^C$ |
| Metrics | | $PMC_i$ |

| Parallel (co-runners) | | |
|---|---|---|
| Domain | | Cycles |
| Run with | | Fixed cycles $\Delta t$ |
| Metrics | | $i_1^{O_1}$ |

FIG. 6

NARX ARCHITECTURE FOR TASK CONTENTION MODELS USING TIME-SERIES AND FINE-GRAIN INSTRUMENTATION FOR MPSoCs

CROSS-REFERENCE TO RELATED APPLICATIONS

The present application claims the benefit of European Patent Application No. 23183378.1, filed Jul. 4, 2023, which is incorporated herein by reference in the entirety.

FIELD

This invention relates to interference channel contention modelling using timeseries forecasting.

BACKGROUND

There has been a recent movement from single core processors to processors with multiple processing cores within the same processor device, which can provide a significant performance increase with a similar amount of power consumption.

As such, a wide range of multi-processor system-on-chip (MPSoC) architectures targeted for embedded applications have appeared on the market over the last years. This kind of SoC includes multiple processing cores, either homogeneous or heterogeneous, on the same die. Multi-core processors (MCP) with two or more processing cores overcome the frequency scaling, power consumption, and heat dissipation problems associated with single core processors, all whilst the effective throughput is increased.

As such, MCPs have delivered significant performance improvements over traditional single-core processors. However, their use in safety-critical systems (such as avionics systems) poses some unique challenges that are otherwise not present in typical single-core processors, which otherwise run a single process at a time.

For efficiency, MCP designs include shared resources on the device. Processor cores in MCPs are typically tightly or loosely coupled, sharing intermediate memory systems (cache hierarchies) and interconnection buses in order to access main memory and external input/output (I/O) devices. MPSoC architectures, in order to simplify board layout design, integrate more components onto the device to reduce the physical footprint.

Depending on the hardware implementation, tasks running on different cores (i.e., different processes or threads) may share some of these resources while they are being executed. For example, FIG. 1 shows an example MPSoC 100 and the resources that are shared between four separate cores (Core0-Core3), specifically the four Level 2 cache banks (L2 Bank 0-Bank 3), which the cores access through a common crossbar via respective core/cluster interfaces (CCI), and the common bus interface unit (BIU), Interconnection Network (IN), three direct-memory access units (DMA0-DMA2), and memory (MEM). However, the simultaneous execution of tasks on a parallel computer architecture can cause contention in the form of delays accessing certain shared resources and thus interference and variability on their typical execution time. For example, in the MPSoC 100 of FIG. 1, contention is highlighted as occurring in the two L2 banks Bank 1 & 2, although it can of course occur in other resources at other times, depending on what tasks are being executed simultaneously. Contention can be a particularly serious issue when it comes to real-time and/or safety-critical systems.

In safety-critical applications, for example in avionics systems such as those for helicopters or other aircraft, there are specific requirements that stem from the concurrent performance of tasks in MCPs. These include application isolation and determinism. Application isolation relates to the separation of the tasks of one application from the rest of the running processes, e.g., to shield the application from exploits. Determinism is the property of, when given a particular input, always producing the same output, and always passing through the same sequence of states. Furthermore, in such situations and for certification, it is typically necessary to know the actual execution time of a given set of tasks, which cannot be known without knowing the structure of a MCP and any potential contention between the tasks.

In this way, when providing a MCP for safety-critical uses, it is generally necessary to ensure that multiple applications running on a single core do not interfere with another application's performance, and additionally that each core will execute its designated tasks in the proper sequence at all times, and within an acceptable time period.

Multi-core semiconductor manufacturers designing MCPs for the commercial market tend to optimize their processors for performance, not safety and isolation, and additionally do not tend to publish details of the internal structure of their MCPs. In this way, it is difficult to predict the kinds of scheduling conflicts that might occur. This can make it challenging to design software for execution by such processors, especially in safety-critical contexts.

Specifically, in the real-time embedded system realm for avionics, task interference due to the contention on shared resources poses a big challenge for determinism, and therefore, certification. The uncertainty of not knowing beforehand the actual execution time on an MCP hinders certification on the avionics scope, e.g., as detailed in the CAST-32A, MULCORS and ARINC-653 papers.

It is common to describe control systems using model-based design techniques (MBD), where a system is modelled as a network of interconnected data processing blocks (also referred to as tasks) that execute repeatedly and send data to each other. Two examples of such execution models are multi-periodic (MP), where each task is executed with a certain fixed periodicity, and synchronous dataflow (SDF), where a task is executed when data is available in all of its inputs.

Most general purpose modelling tools use multi-periodic execution models with configurable options about priorities, parallelization, etc. While this is very intuitive for algorithm designers, it can be problematic in that execution relationships amongst tasks are very often arbitrarily selected. Migrating these models, including behavioral and scheduling aspects, to a multi-core embedded computer is very challenging since the granularity of the tasks, proportionality amongst periods, feedback loops, etc. are typically not well optimized.

Therefore, whilst MCPs can advantageously execute tasks in parallel, such operation can result in some or all of the issues outlined above, e.g., delays or failures relating to contention, which must be avoided in safety-critical applications where tasks must be completed within a given time window.

SUMMARY

According to a first aspect, there is provided a computer-implemented method of predicting a timeseries of time delays resulting from contention between tasks running in parallel on a multi-processor system using a trained Machine Learning based Task Contention Model, ML based TCM, the method comprising: executing a plurality of actual execution tasks on the multi-processor system in isolation, and for each task and during execution of the respective task, capturing a timeseries comprising a plurality of uWindows by capturing a plurality of snapshots, each snapshot comprising an array of performance monitoring counters, PMCs, since the previous snapshot, and the time since the previous snapshot; inferring, from a time-agnostic ML based regressor, a predicted contention delay for the first uWindow of the timeseries when two or more of the plurality of actual execution tasks are executed on parallel on the multi-processor system given the first captured snapshot for each of the tasks to be completed in parallel; and inferring, from a Non-linear AutoRegressor with exogenous inputs, NARX, predicted contention delays for each subsequent uWindow of the timeseries based on the respective captured snapshot, and the predicted values for the previous time periods fed back into the NARX.

In this way, the present invention provides a way of more accurately characterising delays resulting from contention between tasks being executed in parallel on a multi-processor system. This is done by using a fine-grain instrumentation approach, thereby more accurately characterizing how a task accesses various resources at different points of its execution, rather than a course-grain approach which only can give a broad overview of the entire task, assuming all resources are equally accessed over the entire duration of the task. As a result, a scheduling and mapping optimization algorithm is able to provide better ranked alternatives when using TCMs based on this time-series data.

As would be understood, a uWindow refers to a window of time that makes up a timeseries. These are populated by periodically capturing snapshots at the end of each window during the execution of a task on each core. These snapshots can capture various pieces of information which can provide information about the execution of the task during the time period of the preceding uWindow. For example, the snapshot might capture an array of PMCs that have been captured during the time period of the preceding uWindow, in respect of its given processor.

The time-agnostic regressor may be a machine learning based predictor.

Each of the uWindows may span a fixed number of processor cycles, such that each snapshot occurs at a fixed periodicity.

The method may further comprise compensating for missing values in the gathered PMC data by deletion, interpolation, mean/mode/median imputation, or prediction.

The NARX may utilise a machine learning algorithm. Such an algorithm may be robust to errors in the collected PMC data.

According to a second aspect, there is provided a computer-implemented method of producing training data for training a Non-linear AutoRegressor with exogenous inputs, NARX, to predict a timeseries of time delays resulting from contention between tasks running in parallel on a multi-processor system. The method comprises: executing a plurality of tasks on respective processors of the multi-processor system in parallel, and for each task (task$_j$) running on its respective processor: measuring a timeseries in the time domain, the timeseries comprising a plurality of uWindows, each uWindow spanning a predefined time period ($\Delta$t) and comprising the workload performed for each task on its respective processor in terms of instructions executed $$\left( i_n^C \right)$$

during its respective time period of the measured timeseries; executing each of the plurality of tasks in isolation on the respective processors of the multi-processor system in isolation, and for each task (task$_j$) running on its respective processor: measuring a corresponding timeseries in the workload domain, the timeseries comprising a plurality of uWindows, each uWindow spanning a time period corresponding to the time taken to perform the corresponding instructions $$\left( i_n^C \right)$$

to those completed in a respective time period of the timeseries in the time domain, such that each uWindow measured in the workload domain corresponds in terms of instructions completed to a respective uWindow in the time domain; the timeseries in the workload domain further comprising an array of resultant performance monitoring counters, PMCs, counted during each uWindow measured in the workload domain; and calculating time difference ($\Delta t_i$) between the duration of each uWindow measured in the workload domain and its respective uWindow in the time domain.

In this way, there may be provided a dataset that can be used to train, for example, a NARX architecture of the first aspect. In order to do so, there is a method provided which matches the execution cost of "solo" uWindows (profiling information of tasks obtained in isolation) with fully synchronized co-running windows, which are obtained when the tasks are executed in parallel, and tasks are contending each other.

By doing so, it is possible to ensure that multiple snapshots of the time-series are equivalent to each other on both instrumentation domains: cycle domain (which comprise fixed $\Delta t$ uWindows in co-running mode) and instruction domain (which defines a predefined workload for Core C in uWindow n $$\left( i_n^C \right)$$

in solo mode). The workload (number of requests with respect to instruction performed) matches in both domains, so as to provide a means to compare the isolated and parallel data and generate the proper input and output training data for the model.

The plurality of uWindows measured in the time domain may be created by capturing a plurality of parallel instrumentation snapshots, each parallel instrumentation snapshot comprising a count of the instructions executed $$\left( i_n^C \right)$$

by the respective processor within the time period ($\Delta$t) since the previous snapshot.

The method may further comprise creating a trigger array with the instruction executed values $$\left(m^{C}_{trigger} = \{i^{C}_{1}, i^{C}_{2}, \dots, i^{C}_{n}\}\right)$$

for each processor executing a respective task.

The plurality of uWindows measured in the time domain may be created by capturing a plurality of isolated instrumentation snapshots, each isolated instrumentation snapshot being triggered according to its respective created trigger array such that each parallel instrumentation snapshot corresponds to a respective isolated instrumentation snapshot in terms of instructions executed. This allows for accurate comparison of the isolated and parallel data in order to accurately determine the delays that result from contention.

The NARX may utilise a machine learning algorithm. Such an algorithm may be robust to errors in the collected PMC data.

According to a third aspect, there may be provided a computer-implemented method of training a Non-linear AutoRegressor with exogenous inputs, NARX, to predict a timeseries of time delays resulting from contention between tasks running in parallel on a multi-processor system. The method comprises: producing training data as provided in the second aspect; and training a machine learning model using, as an input, the timeseries measured in the workload domain for each task; and, at the output, the corresponding $\Delta t_i$ experienced during the parallel execution of each pairing scenario.

Said another way, the present invention may provide a computer-implemented method of producing a trained Non-linear AutoRegressor with exogenous inputs, NARX, to predict a timeseries of time delays resulting from contention between tasks running in parallel on a multi-processor system. The method comprises: executing a plurality of tasks in parallel on respective processors of the multi-processor system; and during execution of the plurality of tasks in parallel and for each task (task$_j$) running on a respective processor: capturing a timeseries of parallel instrumentation snapshots, the parallel instrumentation snapshots each comprising a count of the instructions executed $$\left(i^{C}_{n}\right)$$

by the respective processor within the time period ($\Delta t$) since the previous snapshot; creating a trigger array with the instruction executed values $$\left(m^{C}_{trigger} = \{i^{C}_{1}, i^{C}_{2}, \dots, i^{C}_{n}\}\right)$$

for each processor executing a respective task; executing each of the plurality of tasks in isolation on the multi-processor system; and during execution of each of the plurality of tasks: capturing a timeseries of isolated instrumentation snapshots, each isolated instrumentation snapshot being triggered according to its respective created trigger array such that each parallel instrumentation snapshot corresponds to a respective isolated instrumentation snapshot in terms of instructions executed, each isolated instrumentation snapshot comprising an array of performance monitoring counters, PMCs, since the previous snapshot, and the time since the previous snapshot; calculating the time difference ($\Delta t_i$) between completion of each parallel instrumentation snapshot and completion of its respective isolated instrumentation snapshot; and training a machine learning model using, as an input, the timeseries of isolated instrumentation snapshots for each task, and, at the output, the corresponding $\Delta t_i$ experienced during the parallel execution of each pairing scenario as training inputs.

The NARX of the first aspect may be a NARX architecture that has been trained by the method of the third aspect.

According to a fourth aspect, there may be provided a computer-implemented method of generating software to be executed on a multi-processor system. The method comprises: scheduling and mapping a plurality of tasks to respective cores of the multi-processor system by inputting a behavioural model of an application as an input to a scheduling solver; inputting, into the scheduling solver, a timeseries of time delays resulting from contention between at least two of the plurality of tasks running in parallel on respective processors of the multi-processor system predicted by the method of the first aspect; and outputting, based at least in part to the time delays, mapping and scheduling data that can be used in producing executable code for execution on multi-core processors.

In this way, the predicted delays may be used to better schedule tasks on a multi-processor so as to reduce the total amount of contention.

BRIEF DESCRIPTION OF THE DRAWINGS

Certain examples of the disclosure will now be described, by way of example only, with reference to the accompanying drawings, in which:

Figure 1:
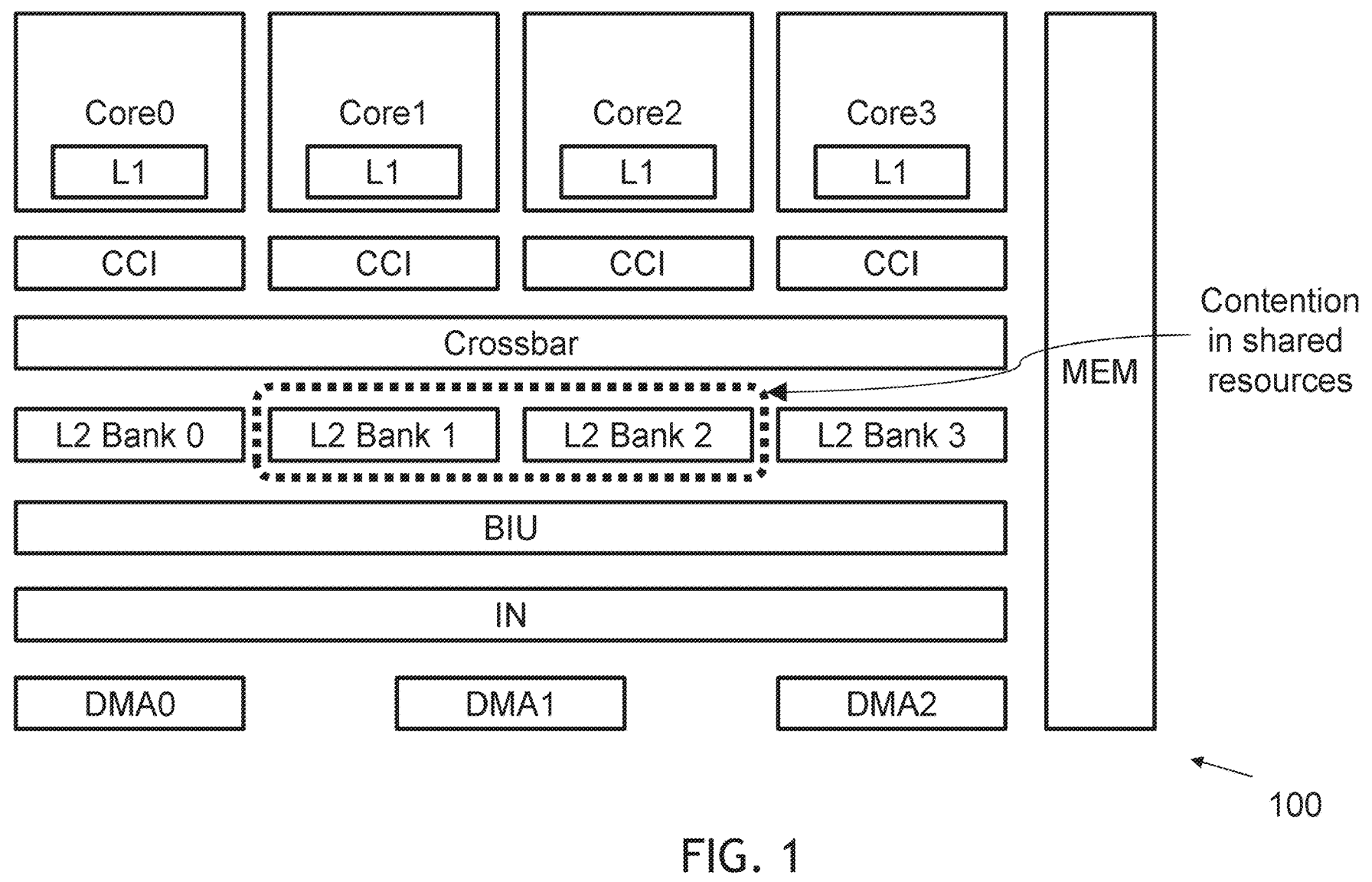

FIG. 1 is a schematic diagram of an example MPSoC with multiple computational units, shared memory hierarchies, and interconnection buses.

FIG. 6 shows matching between cycle domain (parallel) and instruction domain (isolation), in accordance with one or more embodiments of the present disclosure.

DETAILED DESCRIPTION

Whilst the methods and systems herein may be described with regards to a multi-core processor (MCP), it would be appreciated that the teaching herein is not limited to only a single processor with multiple cores, but also other multiple processing systems, such as a network of separate processors (i.e., multi-processor systems).

Figure 2:
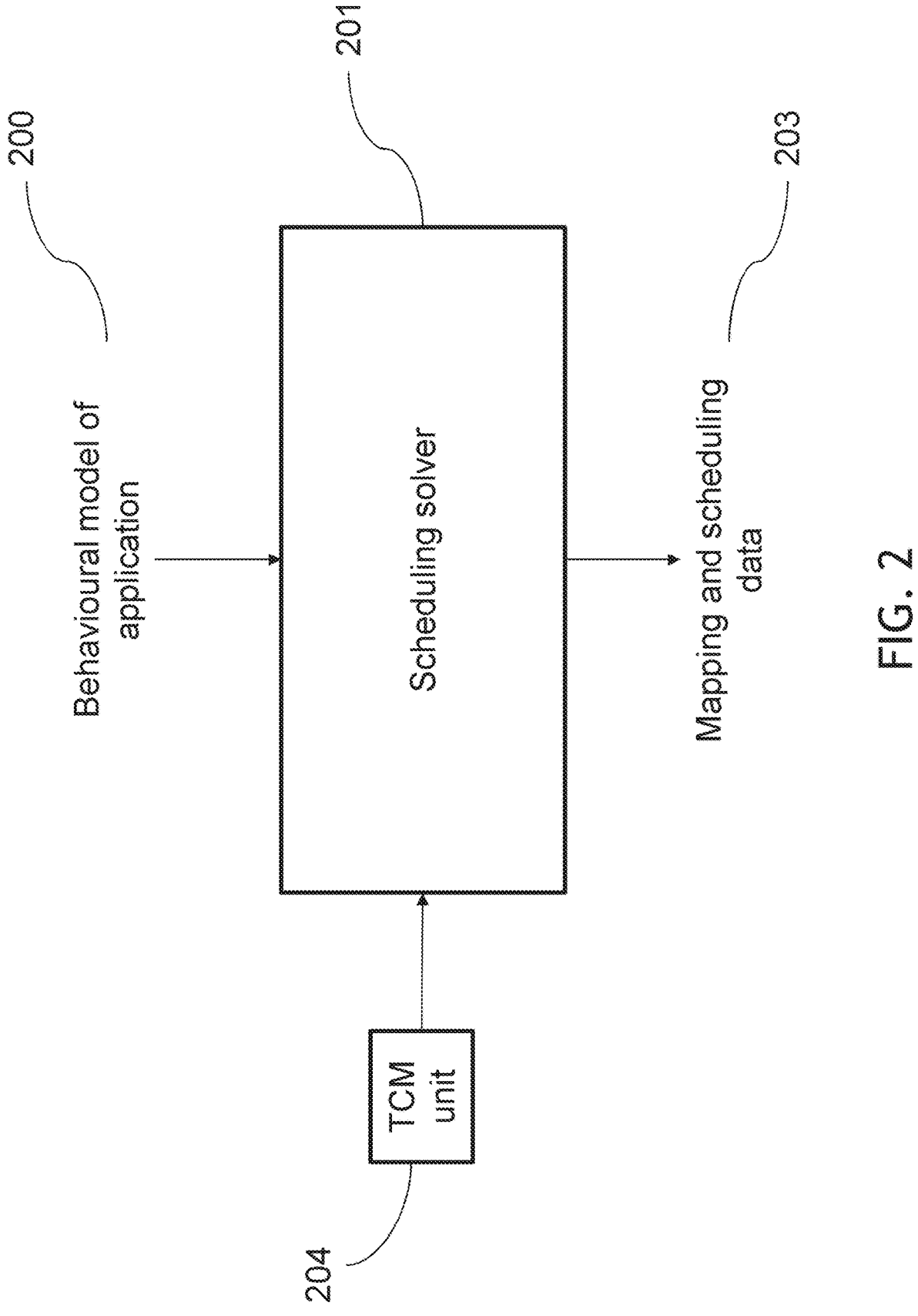
FIG. 2 is a schematic diagram of a system for producing software for a MCP, in accordance with one or more embodiments of the present disclosure.

For implementation on a given MCP architecture, the tasks of a control system need to be scheduled and mapped to respective cores, e.g., using a system as shown in FIG. 2, in order to generate software that can be executed on the particular MCP (e.g., within an aircraft). In the example of FIG. 2, a behavioural model (i.e., an execution model) of an application 200 is provided as input to a scheduling solver 201, which outputs mapping and scheduling data 203 that can be used in producing executable code for execution on multi-core processors.

In the context of MCPs, the scheduling solver 201 determines a time-partitioned schedule, which schedules executing tasks in synchronized time windows in order to guarantee a certain level of isolation. This is a static approach where tasks are mapped to a per-core "ready" queue prior to scheduling and cannot migrate between cores. However, even with such isolation, contention delays still occur in multi-core systems due to the concurrent accesses to shared resources by tasks executed concurrently in the same or different partitions. It is difficult to predict the delays that will result from such contention delays due to the high number of possible core and task combinations, which lead to different delay values. These delays should be considered when computing schedules where the make-span (i.e., total execution time) is to be minimized.

It is possible to approximate contention delays by extracting a task contention model (TCM) from the hardware platform, and inputting delays determined from this model into the scheduling solver 201. In order to shed some light on the predictability of Real-Time applications on MCP architectures, TCMs can be built to help estimate the worst case execution time (WCET) for each possible set of contending tasks depending on the final task-to-core mapping.

TCMs can be useful to help predict the amount of contention that is likely to be present in a proposed schedule, or potential contention between a given pair of tasks when running simultaneously. A TCM receives at its input, the execution footprints of a set of tasks to be executed in parallel on a particular MCP architecture. Then, the TCM generates the WCETs of the tasks, taking into account the contention between given tasks. This data can then be used to find the best task mapping/scheduling that minimizes the total execution time.

In order to build an accurate TCM, several ingredients are required. First, detailed information about the interference channels on a given architecture must be provided, e.g., behaviour, read and write policy, maximum throughput, frequency, access concurrency, arbitration policies, or any other peculiarity that might affect concurrent access performance. As mentioned above, access to the specifications of the interference channels is very limited in commercial off-the-shelf (COTS) MCP devices, where information is usually not clearly documented by the manufacturer.

As a consequence, researchers and engineers looking to build an accurate TCM must develop ad-hoc microbenchmarks (uBenchmarks) that stress interference channels of a MCP to unveil and characterize their behaviour in detail. Such uBenchmarks generally operate by generating specific activities on shared resources, and as a result, they bring out multicore timing interference and, ultimately allow for analysis of the impact of interference channels on software timing. μBenchmarks can be selectively deployed to cause a configurable and quantifiable pressure on a specific resource, and in this regard, the selection of suitable uBenchmarks can be vital in producing an accurate TCM.

Every task to be analysed by the TCM and contended with another task must be previously instrumented or sampled to extract their shared resource usage pattern or footprint (either coarse or fine). To carry out this work, hardware performance monitoring counters (PMCs) must be read at several points of the task execution in isolation in order to generate an accurate resource footprint. PMCs are hardware counters built into modern processors that count the number of events of a certain type (e.g., number of instruction cycles or number of cache misses) at run-time.

Collecting all the required information can be tedious and usually extremely time consuming, requiring a great expertise on the platform to analyse. In addition, the process is not generic and requires very specific information that is tailored to a given architecture. This means that uBenchmarks, TCMs, and the set of PMCs to gather must be adapted every time a new platform is added. For example, if it is desired that a new COTS MCP is used, then this information must again be determined for that specific architecture, before certification for its use in safety critical uses can be achieved. This process is usually achieved by analytical models, which again are very time consuming, as well as requiring highly skilled operators to gather the required data, for each piece of hardware that is desired to be used.

However, it has been recognised that, to tackle the above outlined complexity of building TCMs by hand (using analytical models), Machine Learning (ML) may be utilised to generate a black-box TCM for a given platform to build an AI model that is able to accurately predict task's WCETs and the timing of each interference channel, given their behaviour in isolation. Such a ML based framework is explored in European patent applications EP22174935.1 and EP21206561.9, which are incorporated herein by reference in their entirety. Experimental results revealed that this approach yields much more precise and realistic predictions of the contention delays and are around 1000 times faster than analytical methods.

However, these models are agnostic to the time dependency present in the continuum of PMC events, which can impart more data for describing potential contention effects between bursts of events.

On Von Neumann architectures, the execution of a set of instructions generates requests that are submitted from the CPUs (acting as originator) to the specific shared resources (destination). The destination, consisting of hardware resources such as caches, main memories, peripherals, or buses, exhibits some latency on providing or processing the specific data. This latency entails that subsequent requests may have to be queued in temporal buffers until the resource becomes available again.

As a collide effect, if the CPU instructions that command these accesses for reading or writing are sampled in a fixed interval of requests ($\Delta i$ instructions per uWindow), there will be a correlation between the time that a given interval (uWindow$_t$) will require to be processed and the time required by the next immediate in the execution flow (uWindow$_t$+1). Such an effect reveals that in fact there exists a time dependency between subsequent instructions.

Requests issued by the computing cores of MPSoCs depend heavily on the task's machine code. In addition, the access pattern does not occur in a time-triggered manner but rather in sporadic bursts or phases when IO operations (reads and writes to and from devices or peripherals) must be conducted for a specific purpose.

As shown in ML based approaches to producing a TCM, such as those of EP22174935.1 and EP21206561.9, a task profile can be generated to characterize the usage of shared resources of the contending tasks. Based on these profiles, TCMs can predict the expected delay when tasks are executed in parallel.

Typically, this task profiling uses a discrete approach, where coarse-grain instrumentation is obtained for tasks under analysis. This approach relies on an assumption that PMC events happen in a uniform manner.

Figure 3:
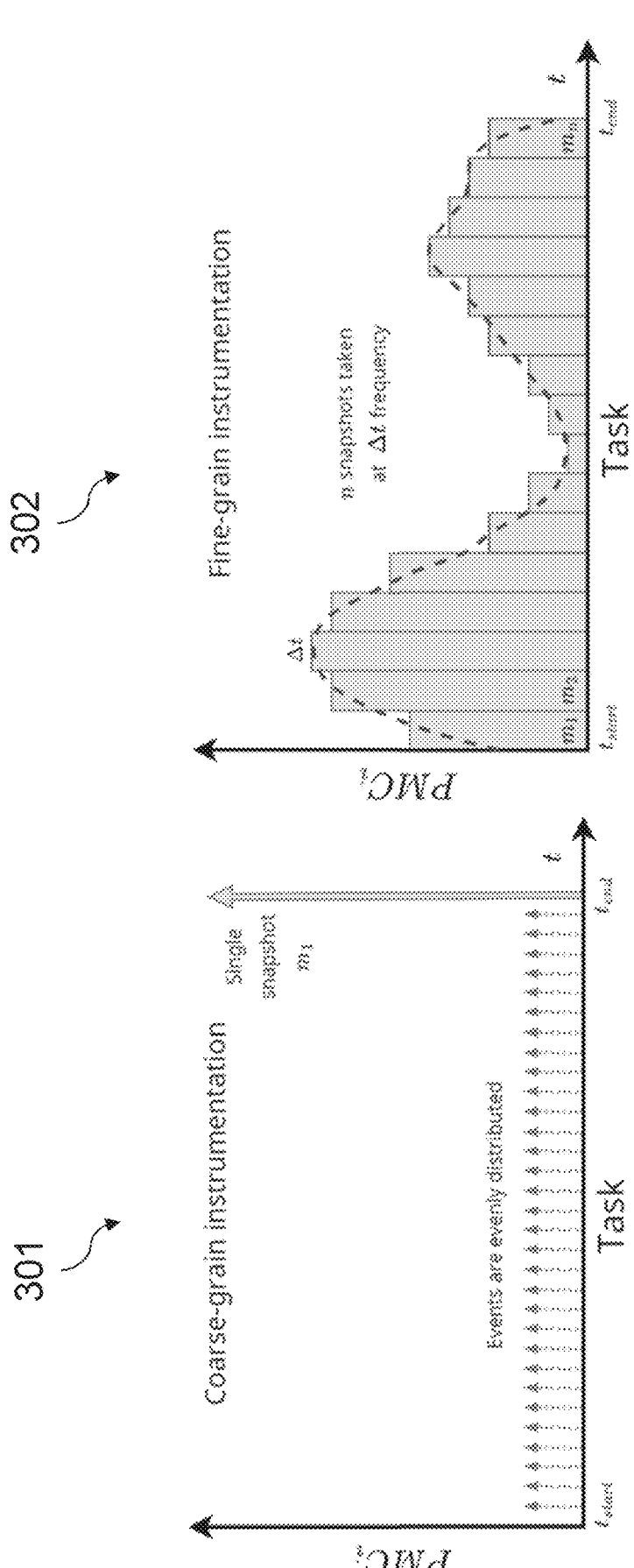
FIG. 3 is an illustration of coarse-grain instrumentation vs fine-grain approaches for task profiling, in accordance with one or more embodiments of the present disclosure.

For example, as seen in graph 301 in FIG. 3, instrumentation mechanisms usually sample event counters at the entry-point ($t_{start}$) and exit-point ($t_{end}$) of the task under analysis. In this way, they generate a single snapshot for the metric instrumentation ($m_1$) for a given $PMC_i$. In this approach, it is assumed that the metric is evenly distributed along the duration of the task ($t_{end}-t_{start}$).

However, graph 302 shows a more accurate characterization of the occurrence of PMC events using a fine-grain instrumentation mechanism. As can be seen, the dotted line depicts the actual distribution of instantaneous events for $PMC_i$ in the task, and the $m_i \times \Delta t$ bars show how these events are (more) accurately captured using such a fine grain instrumentation. Between $t_{start}$ and $t_{end}$, a total number of $m_n$ samples are stored at a constant $\Delta t$ frequency.

Advantageously, by using the fine-grain instrumentation approach, a scheduling and mapping optimization algorithm (such as the scheduling solver 201) may provide better ranked alternatives when using TCMs based on time-series data. Such TCMs may provide more accurate and detailed results, as well as a number of task's profiles combinations that minimize contention on MPSoCs.

Said another way, applications run on MPSoCs take some time to execute, but along their execution time they do not necessarily use their resources in the same way along the entire time period. The tasks may need to only access the resources at one time. This can affect the amount of contention that might be experienced, when two tasks are executed in parallel. For two different tasks, one may use the shared resources more intensively at the beginning, and the other may use the resource more intensively at the end. Whereas, in such a situation using a coarse-grain approach, it may have been assumed that each task used the resources equally over the whole time and therefore have resulted in a certain degree of contention (or not), by providing a fine-grain approach, it may be possible to see that the tasks access the shared resources at different times, and therefore do not result in contention. In this way, by changing from a discrete approach to a time series approach it is possible to build a more sensitive and accurate TCM model.

Figure 4:
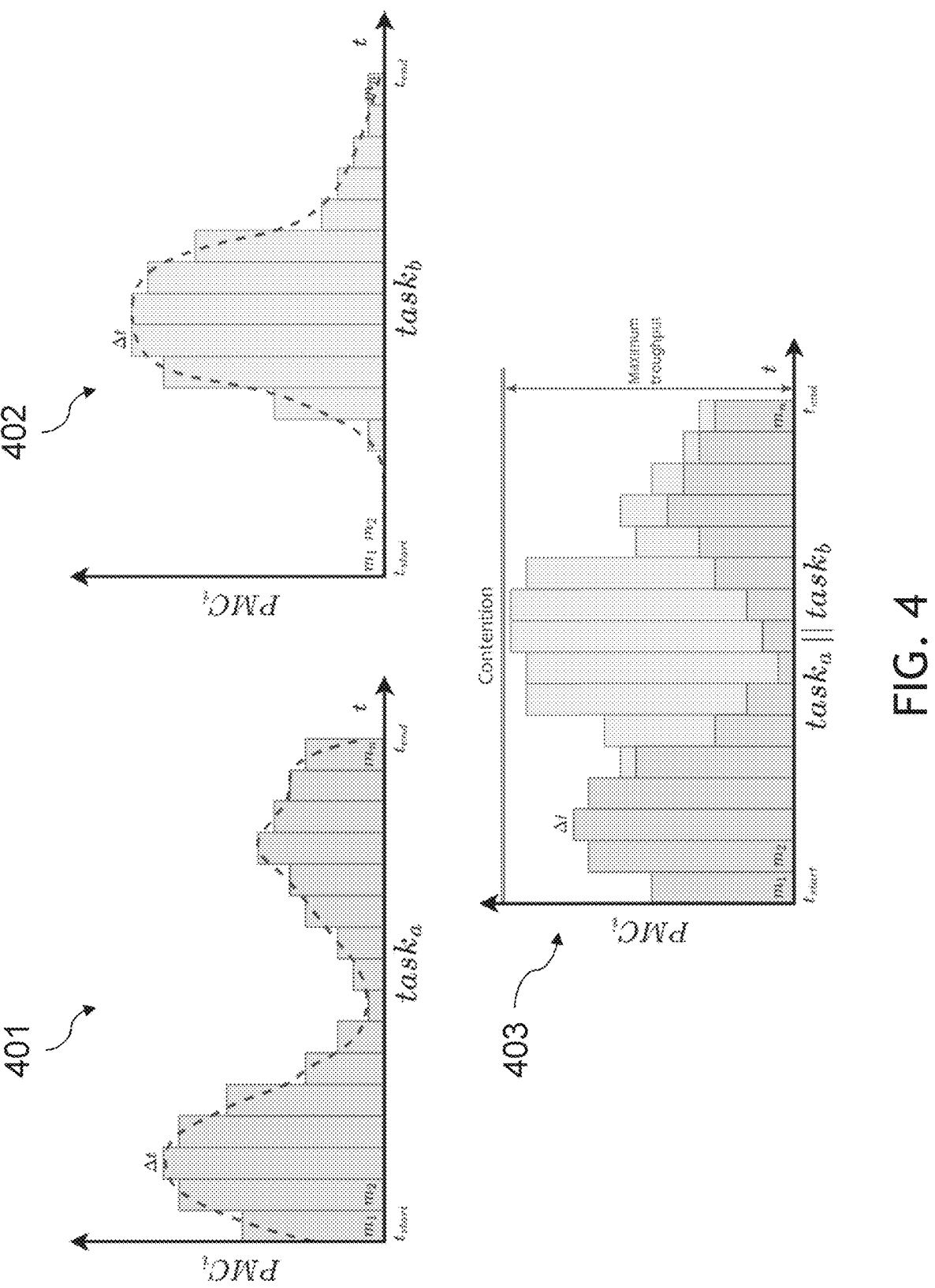
FIG. 4 is an illustration of the contention effect produced due to the execution in parallel of tasks a and b, in accordance with one or more embodiments of the present disclosure.

Such an example may be seen in FIG. 4, where two complementary tasks' profiles (e.g., task a and task b) generate compatible execution profiles 401, 402 in terms of low contention for the scheduling planner (optimization tool). Using a fine-grain instrumentation mechanism and time-series information provided (n samples, m={$m_1$, $m_2$, . . . , $m_n$}), the TCM can infer that the usage of the shared resource that may generate interference (provided by $PMC_i$ metric) is under nominal values (i.e., below the maximum throughput of the shared resource) as can be seen in graph 403, and therefore will not generate any potential contention and execution delay if they are executed in parallel ($task_a$-||$task_b$).

Such a task profile may be predicted by time series forecasting, i.e., by using historical and current data to predict future values over a period of time. Such models may be used to analyze collected time-series data, describe and interpret them, as well as make certain assumptions based on shifts and probabilities in the collection.

ML has proven to help better process both structured and unstructured data flows, swiftly capturing accurate patterns within large amounts of data. Many ML methods for time series forecasting have been introduced over the years, such as Recurrent Neural Networks (RNN) and Long Short Term Memory (LSTM) architectures. However, issues arise when an exogenous input (i.e., data having an external origin) must be considered, in addition to the past values of the series.

As a solution to such issues, alternative models that can integrate such inputs may be used, such as Non-linear AutoRegressor with exogenous inputs (NARX) models. NARX is an umbrella term for many non-linear autoregressors that also handle exogenous inputs used for timeseries forecasting. This means that the model relates the current value of a time series to both past values of the same series, as well as current and past values of the driving (exogenous) series.

Figure 5:
FIG. 5 shows an example MLP-based NARX network with d$_u$ delayed inputs and d$_y$ delayed outputs, in accordance with one or more embodiments of the present disclosure.

Such a model can be algebraically stated by the following equation:

$$y(t) = f(y(t-1), y(t-2), \ldots , \qquad \text{Equation 1}$$
$$y(t-n_y), u(t-1), u(t-2), \ldots , u(t-n_u))$$

where the next value of the dependent output signal y(t) is regressed on previous values of the output signal and previous values of an independent (exogenous) input signal. The nonlinear mapping $f(\bullet)$ is generally unknown and can be approximated, for example, by a standard multilayer perceptron (MLP) network, such as the MLP-based NARX network 500 seen in FIG. 5. The MLP-based NARX network 500 has $d_u$ delayed inputs and $d_y$ delayed outputs, where z−1 is the unit time delay.

The autoregressor utilized in most NARX implementations is usually an RNN, although, in reality, any other non-linear regression model (such as Random Forest, Support Vector Machines, or almost any other regressor) may be used to implement a NARX architecture. Regardless of the autoregressor, the inputs and feedback should be given to the model of choice to ensure it satisfies the above equation.

In view of the above, a machine learning-based timeseries forecasting autoregressor may be utilized to solve the problem of TCM in multicore processors. In order to do so, a time-series instrumentation approach may be utilized to gather data, and a NARX architecture may be trained and used to iteratively process PMC information to predict contention delays.

As would be appreciated, the gathering of the instrumentation data is fundamental to generate valuable training data for the TCM model. In order to do so, the execution cost of "solo" uWindows (profiling information of tasks obtained in isolation) are matched with fully synchronized co-running windows, which are obtained when the tasks are executed in parallel, and tasks are contending each other, as illustrated in FIG. 6.

By doing so, it is possible to ensure that multiple snapshots of the time-series are equivalent to each other on both instrumentation domains: cycle domain (which comprise fixed Δt uWindows in co-running mode) and instruction domain (which defines a predefined workload for Core C in uWindow n $$\left(i_n^C\right)$$

in solo mode). The workload (e.g., number of requests with respect to instruction performed) should match in both domains, so as to provide means to compare the isolated and parallel data and generate the proper input & output training data for the model.

One such algorithm follows a bottom-top approach, where the time delays are computed in the cycle domain first, and then, based on the instructions executed $$\left(i_n^C\right),$$

the profile characterization of the uWindows are performed in isolation (instruction domain). In such a case, the processor cycles and instructions executed must be measured. The instruction executed allows for a direct and precise relationship to be made between two uWindows in different domains, whereas the processor cycles permit the computation of the expected delay $$\left(t_{parallel}^{core} - t_{solo}^{core}\right).$$

Such an approach may follow the following steps:
1. Set a fixed and common Δt for all uWindows in the co-running mode (e.g., 9000 cycles). The Δt (# of cycles) should be conformant with the desired granularity for the target platform. A very small Δt would not capture enough instructions that may produce contention effects. On the contrary, a very large Δt will begin to approach a coarse-grain instrumentation, and therefore cause the fine-grain implementation to lose accuracy and the essence of the time-series rationale.
2. Cycle domain. Each pairing scenario of tasks (e.g., task_a‖task_b) must be executed in parallel (with co-runners) so as to experience the expected delay (in cycles). The selected tasks should be deployed, synchronized, and instrumented to the target platform at an exact and chosen frequency (e.g., uWindows of 9000 cycles). This may be instructed by an instrumentation mechanism, such as a software apparatus. In this way, the Performance Monitoring Unit (PMU) of the target platform should be instructed to:
   a. Take instrumentation snapshots (samples) at the fixed Δt frequency from step 1.
   b. Each snapshot must include at least the processor cycles occurred and the number of instructions executed in that Δt period. The instruction executed will provide information about the execution progress and how the contention has affected to the uWindow_i for task_j.
   c. Repeat steps 2.a) and 2.b) for all the existing uWindow during the execution in parallel, obtaining therefore m_n samples for each task. The trigger condition for each measurement is Δt (m_trigger={Δt, Δt, . . . , Δt}).

3. Instruction domain. Obtain the profiling of each uWindow; for task, in isolation. Every task from the pairing scenario must be re-executed in isolation without contending tasks:
   a. Using the instruction executed metric for each uWindow; and task;

$$\left(i_n^C\right)$$

obtained in step 2, command the instrumentation mechanism to set $$i_n^C$$

workload as the snapshot trigger to obtain the characterization of the same uWindow in isolation.
   b. Repeat step 3.a) for each task_j of the pairing and for each recorded instruction executed metric $$i_n^C.$$

This will create the corresponding mapping between the parallel (with co-runners) and isolation (solo) runs. Therefore, each timing window (uWindow_i) will have a correspondence in the cycle and the instruction executed domains. The trigger condition for each measurement (m_i) is an array with the instruction executed values $$\left(m_{trigger}^C = \{i_1^C, i_2^C, \dots, i_n^C\}\right)$$

for each core.

Figure 7:
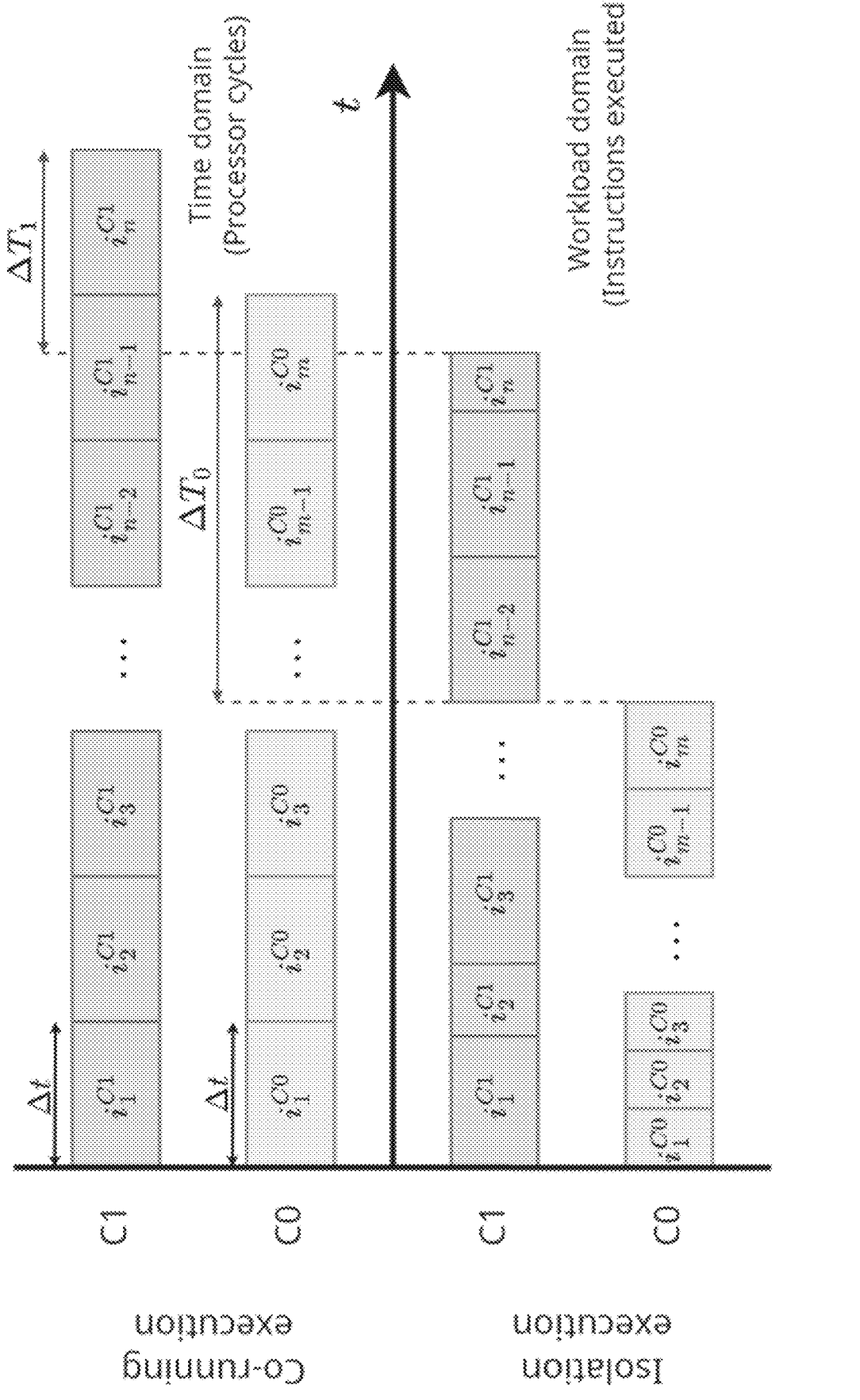
FIG. 7 shows mapping between the time domain (processor cycles) and Workload domain (instructions executed), in accordance with one or more embodiments of the present disclosure.

This is illustrated in FIG. 7, which shows the mapping between the time domain (processor cycles) and the workload domain (instructions executed) on two cores, C1 and C0. The $$i_n^C$$

term (i.e., the instructions executed) between both domains are equivalent in workload. In this way, the same number of instructions are executed in each domain. However, the duration of these uWindows (Δt) differ between the time domain and the workload domain, due to the effects of contention.

As can be seen, time windows of Δt size (uWindow_i) are fully synchronized in the Time domain (processor cycles). These sampling regions (e.g., $$i_1^{C0} \text{ and } i_1^{C1}\right)$$

overlap in time, which produces the slow-down that needs to be captured (owing to contention effects). All samples are obtained at the same instant on all cores to ensure that the contention produced by co-runners is properly captured on each window simultaneously. In this domain, the windows are bound to Δt (i.e., a fixed number of cycles) as a trigger for the instrumentation.

The instrumentation mechanism may then perform the corresponding mapping of the tasks in isolation on each core of these time-windows in terms of workload (in terms of instructions executed). Taking each $$i_n^C$$

value, these measures of instructions can be used to sample tasks in solo (isolated) mode at a variable number of instructions executed as a way to match the same workload on both domains. These snapshots are used to characterize each time-window in isolation by means of PMCs that are gathered during the respective time-windows, when the task is run in isolation. Therefore, when running the tasks on their respective cores in isolation and taking snapshots according to the number of instructions executed, it is possible to see exactly how (and when) contention is being experienced.

For example, as can be seen in FIG. 7, on C1 (when executing a task in parallel with C0), during the first number of cycles Δt, C1 completes $$i_1^{C1}$$

instructions. Then, when being run in isolation, it can be seen that it takes roughly the same number of cycles for C1 to complete $$i_1^{C1}.$$

It may therefore be said that there is no (or at least, relatively low levels of) contention between the tasks being co-run on C1 and C0 early on in their execution. However, in isolation, C1 completes $$i_2^{C1}$$

instructions in much fewer cycles than it did when running in parallel with a task on C2. It can therefore be said that there exists significant contention in this time-window.

The total difference in time (i.e., the total amount of contention) between the execution of tasks on core C1 in isolation and in parallel may be seen as ΔT₁, and on C2 as ΔT₂. This can be broken down into individual contention delays per window, of Δt_i.

Such an approach allows for the proper alignment to be generated, and an overlap between solo and co-running executions for all tasks. Such mapping between the time and workload domains allows for all the time-window samples to be easily processed into a ML model in a time-series fashion, being able to fairly compare all of the samples during training and inference phases.

Figure 8:
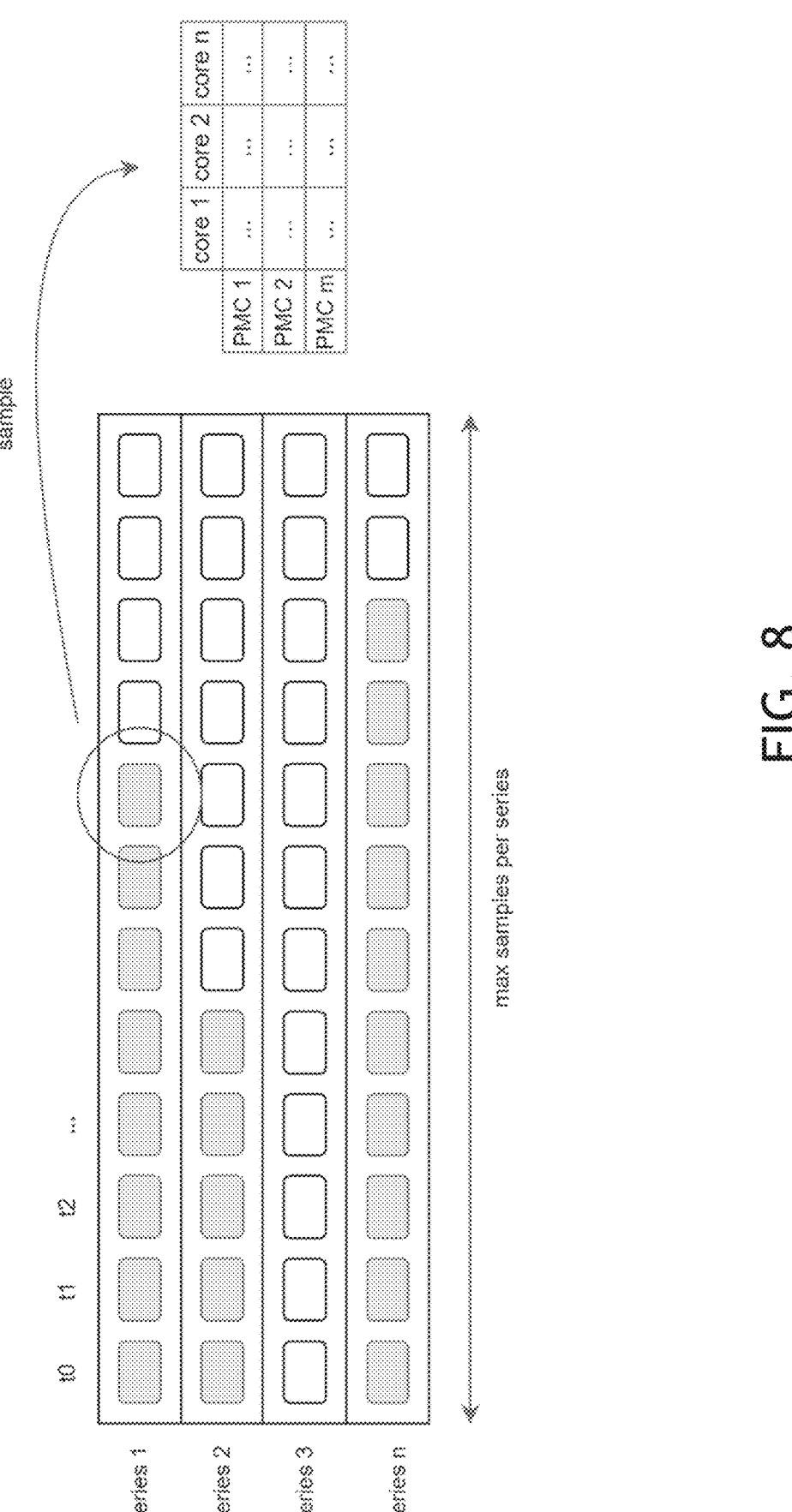
FIG. 8 shows an example dataset compiling of a timeseries for forecasting contention delays, in accordance with one or more embodiments of the present disclosure.

By considering a TCM as a timeseries problem, it is possible to develop a model that predicts future contention delays based on the PMCs gathered across the completion of the task, and on past behavior. For each task contention scenario, a series of samples can be considered, as shown in FIG. 8, where each sample consists of the contention delays that results from the parallel execution of those tasks, as well as the values of the PMC counters collected from the running of the respective task in isolation during a specific period in time, for each one of the cores analyzed.

The dataset compiling these series will consist of as many of series as there are permutations between the tasks studied in parallel and in isolation. A maximum number of samples per series needs to be appointed a priori to ensure all series have consistent length. The samples corresponding to measurements when the contention has already ended may be filled with zeros.

Based on these series, a timeseries forecasting of the contention delays (Δt_i) may be achieved. However, models such as a NARX models require at least one previous value in order to predict the next time series value.

Figure 9:
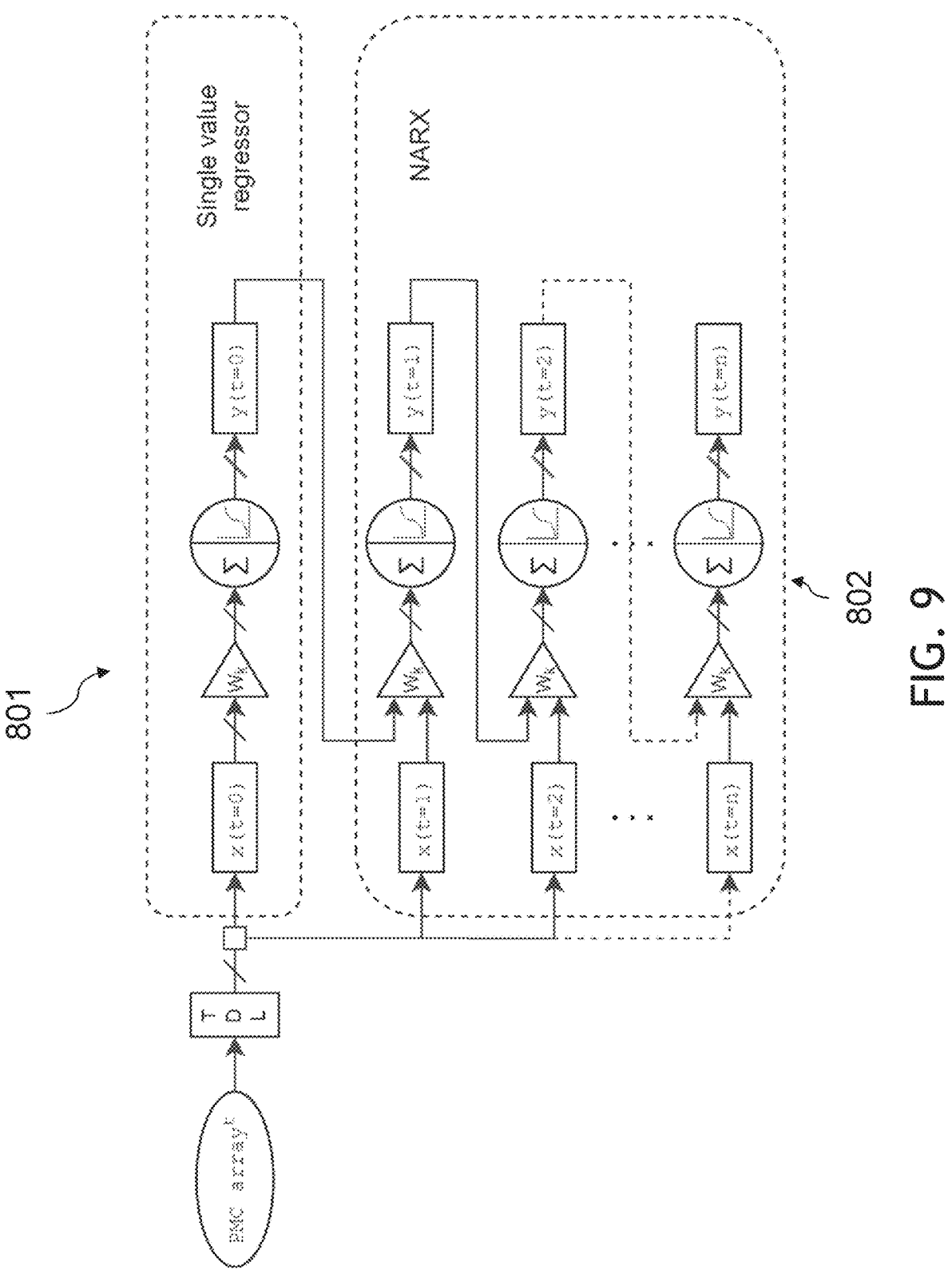
FIG. 9 shows an example NARX based approach to predicting time-based task contention delays, in accordance with one or more embodiments of the present disclosure.

Therefore, a time-agnostic regressor may be used to initially predict the first step of each series. The output of the time-agnostic regressor may then be input into a NARX predictor, as can be seen in FIG. 9. Such a time-agnostic regressor may be trained in a similar manner to those disclosed in EP22174935.1 and EP21206561.9. For example, it may be trained based on course-grain instrumentation. Equally, the time-agnostic regressor may be trained using single time delays that are calculated from the above method, resulting from the comparison of the two uWindows in different domains, and the processor cycles permitting the computation of the expected delay $$\left(t_{parallel}^{core} - t_{solo}^{core}\right).$$

For example, the time-agnostic regressor may be trained, at its input, an array of performance monitoring counters, PMCs, for a plurality of tasks measured during the isolated instrumentation snapshots, and at its outputs, the measured delays for that time period when two or more of those tasks are run in parallel.

In more detail, FIG. 9 shows a time-agnostic regressor 801 and a NARX predictor 802. The time-agnostic regressor 801 is only responsible for predicting the first segmented value of each series, which is necessary for the subsequent NARX predictor 802 to iterate over past values. The time-agnostic regressor model may be any suitable model, for example any ML based regressor.

The rest of the time-series may then be predicted by the NARX architecture 802. The NARX model is responsible for predicting the next value of the series in a sliding window mode of operation. In each iteration, as can be seen, the inputs of the NARX model are:

(a) Past values of the output signal fed back into the predictor using the same mechanisms that conventional autoregressors use.

(b) An array of exogenous series, which in this case consists of the PMC data recorded over past and present values.

The NARX network processes the time-framed data and PMC information as inputs in order to produce predicted contention delays for the processors. The NARX architecture iteratively processes this information, and the outputs from the NARX network provide insight into the expected delays caused by task contention in the multicore processors.

This is an improvement over a time-agnostic equivalent because the time-series instrumentation approach allows for the matching of execution costs for solo and co-runners windows, providing more accurate and relevant data for the NARX network to process. Additionally, the NARX architecture allows for the iteration of this data to produce more accurate predictions of contention delays. This is useful for identifying and addressing potential issues related to task contention in multicore processors.

In addition, such an approach can be robust to flaws in the PMC data. As a result of the PMC data sampling, the PMC data may comprise missing values. As would be appreciated, missing values may be compensated for in many ways, including deletion, interpolation, mean/mode/median imputation, prediction (using a different predictor), or otherwise.

However, it is also possible to rely upon one of the innate properties of certain machine learning algorithms for handling such missing values by default. In some machine learning algorithms, when a missing value is encountered during training, the algorithm will learn the appropriate direction to take in the tree based on the other input features. This allows such an algorithm to handle missing values without the need for imputation or other preprocessing steps.

Such a method can be implemented with independence of the model embedded in the NARX architecture, and is not restricted to any software, framework, or datasets. In addition, it is also agnostic to any hardware platform where it might be deployed in. It may be necessary for the target platform to comprise the following:

An interrupt mechanism to provide notifications to the instrumentation infrastructure whenever an Overflow PMC event happens, as well as a freezing option for the PMCs on overflow event. In this way, the Performance Monitoring Unit or the IP core keeping the instrumentation data on hardware counters should be provided so as to provide capabilities for such mechanisms so as to provide accurate time-series data.

These two features allow for metrics with the frequency sampling mechanism, as well as no overhead due to the boilerplate execution of software handlers for interrupts (Interrupt Service Routine) respectively.

By providing a TCM that utilizes time-framed data obtained through the time-series instrumentation approach consisting of PMC information as inputs, the tasks may be better characterized through a fine-grain instrumentation mechanism. This allows for the PMC to output predicted contention delays for the processors for every sampling timestamp, resulting in better predicted contention delays for every sampling timestamp of the tasks. In addition, such a methodology allows for multiple potential solutions to be proposed for the generation of optimized schedulings and mappings, with low-profile contention on embedded systems. This results in improved predictions, and ultimately less pessimistic solutions for prevention of contention delays.

It will be appreciated by those skilled in the art that the disclosure has been illustrated by describing one or more specific examples, but is not limited to these examples; many variations and modifications are possible within the scope of the accompanying claims.

The invention claimed is:

1. A computer-implemented method of predicting a time-series of time delays resulting from contention between tasks running in parallel on a multi-processor system using a trained Machine Learning based Task Contention Model, the method comprising:

executing a plurality of actual execution tasks on the multi-processor system in isolation, and for each task and during execution of a respective task of the plurality of actual execution tasks, capturing a timeseries comprising a plurality of uWindows by capturing a plurality of snapshots, each snapshot comprising an array of performance monitoring counters, PMCs;

inferring, from a time-agnostic ML based regressor, a predicted contention delay for a first uWindow of the timeseries when two or more of the plurality of actual execution tasks are executed in parallel during a first captured snapshot for each of the plurality of actual execution tasks;

inferring, from a Non-linear AutoRegressor with exogenous inputs, NARX, a plurality of predicted contention delays for each subsequent uWindow of the timeseries based on a respective captured snapshot, and a plurality of predicted values for previous time periods fed back into the NARX; and adjusting a scheduling of the plurality of actual execution tasks based on the plurality of predicted contention delays inferred.

2. The method of claim 1, wherein the time-agnostic ML based regressor is a Machine Learning based predictor.

3. The method of claim 1, wherein each of the plurality of uWindows span a fixed number of processor cycles, wherein each snapshot occurs at a fixed periodicity.

4. The method of claim 1, further comprising:

compensating for missing values in gathered PMC data by at least one of deletion, interpolation, mean/mode/median imputation, or prediction.

5. The method of claim 1, wherein the NARX utilizes a Machine Learning based regressor.

6. The method of claim 5, wherein the Machine Learning based regressor is configured to handle missing values in gathered PMC data by default.

7. A computer-implemented method of producing training data for training a Non-linear AutoRegressor with exogenous inputs, NARX, to predict a timeseries of time delays resulting from contention between tasks running in parallel on a multi-processor system, the method comprising:

executing a plurality of tasks on respective processors of the multi-processor system in parallel and for each task (task$_j$) running on a respective processor:

measuring the timeseries in a time domain, the timeseries comprising a plurality of uWindows, each uWindow of the plurality of uWindows spanning a predefined time period ($\Delta t$) and comprising a workload performed for each task on the respective processor in terms of instructions executed $$\left(t_n^C\right)$$

during a respective time period of the measured timeseries;

executing each task of the plurality of tasks in isolation on the respective processor of the multi-processor system, and for each task (task$_j$) running on the respective processor:

measuring a corresponding timeseries in a workload domain, the corresponding timeseries comprising a plurality of additional uWindows, each additional uWindow of the plurality of additional uWindows spanning a time period corresponding to a time taken to perform the instructions $$\left(t_n^C\right)$$

completed in the respective time period of the measured timeseries in the time domain, such that each additional uWindow measured in the workload domain corresponds in terms of instructions completed to a respective uWindow in the time domain, the timeseries in the workload domain further comprising an array of resultant performance monitoring counters, PMCs, counted during each additional uWindow measured in the workload domain; and calculating a time difference ($\Delta t_i$) between a duration of each additional uWindow measured in the workload domain and a respective uWindow in the time domain.

8. The method of claim 7, wherein the plurality of uWindows measured in the time domain are created by capturing a plurality of parallel instrumentation snapshots, each parallel instrumentation snapshot comprising a count of the instructions executed $$(i_n^C)$$

by the respective processor within the time period ($\Delta t$).

9. The method of claim 8, further comprising:

creating a trigger array with instruction executed values $$(m_{trigger}^C = \{i_1^C, i_2^C, \ldots, i_n^C\})$$

for each processor executing a respective task.

10. The method of claim 9, wherein the plurality of uWindows measured in the time domain are created by capturing a plurality of isolated instrumentation snapshots, each isolated instrumentation snapshot being triggered according to a respective created trigger array such that each parallel instrumentation snapshot corresponds to a respective isolated instrumentation snapshot in terms of instructions executed.

11. The method of claim 7, further comprising:

compensating for missing values in gathered PMC data by at least one of deletion, interpolation, mean/mode/median imputation, or prediction.

12. The method of claim 7, wherein the NARX utilizes a Machine Learning based predictor.

13. The method of claim 7, further comprising:

training a machine learning model using, as an input, the timeseries measured in the workload domain for each task; and, at output, the corresponding $\Delta t_i$ experienced during the parallel execution of each pairing scenario.

14. A computer-implemented method of generating software to be executed on a multi-processor system, the method comprising:

scheduling and mapping a plurality of tasks to respective cores of the multi-processor system by inputting a behavioral model of an application as an input to a scheduling solver;

inputting, into the scheduling solver, a timeseries of time delays resulting from contention between at least two of the plurality of tasks running in parallel on respective processors of the multi-processor system;

outputting, based at least in part on the timeseries of time delays, mapping and scheduling data that can be used in producing executable code for execution on multi-core processors; and adjusting the scheduling and mapping of the plurality of tasks based on a plurality of predicted contention delays inferred, wherein the plurality of predicted contention delays are inferred based on a Non-linear AutoRegressor with exogenous inputs.

* * * * *